(12) United States Patent
Chang et al.

(10) Patent No.: US 7,677,749 B2
(45) Date of Patent: Mar. 16, 2010

(54) OPTICAL PLATE AND BACKLIGHT MODULE USING THE SAME

(75) Inventors: Shao-Han Chang, Taipei Hsien (TW); Fen Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 212 days.

(21) Appl. No.: 11/845,790

(22) Filed: Aug. 28, 2007

(65) Prior Publication Data

US 2008/0266875 A1 Oct. 30, 2008

(30) Foreign Application Priority Data

Apr. 27, 2007 (CN) .................. 2007 1 0200520

(51) Int. Cl.
*F21V 8/00* (2006.01)
*G09F 13/04* (2006.01)

(52) U.S. Cl. ............... 362/97.1; 362/97.3; 362/612; 362/620; 362/626; 362/628

(58) Field of Classification Search ............ 362/29, 362/30, 97.1, 97.2, 97.3, 223, 224, 612, 620, 362/626, 628
See application file for complete search history.

(56) References Cited

U.S. PATENT DOCUMENTS

| 2007/0086179 A1* | 4/2007 | Chen et al. .................. 362/27 |
| 2008/0137335 A1* | 6/2008 | Tsai et al. .................. 362/247 |
| 2009/0010024 A1* | 1/2009 | Chang .................. 362/608 |

\* cited by examiner

*Primary Examiner*—Stephen F Husar
*Assistant Examiner*—James W Cranson
(74) *Attorney, Agent, or Firm*—Frank R. Niranjan (57) ABSTRACT

An exemplary optical plate includes at least one transparent plate unit. The transparent plate unit includes a light output surface, a bottom surface, a plurality of through holes and at least one lamp-receiving portion. The light output surface is opposite to the bottom surface. Each of the through holes communicates the light output surface with the bottom surface. The lamp-receiving portion is defined in the bottom surface. A backlight module using the present optical plate is also provided.

12 Claims, 13 Drawing Sheets

OPTICAL PLATE AND BACKLIGHT MODULE USING THE SAME

CROSS-REFERENCE TO RELATED APPLICATIONS

This application is related to eight copending U.S. patent applications, which are: application Ser. No. 11/835,425, filed on Aug. 8, 2007, and entitled "OPTICAL PLATE AND BACKLIGHT MODULE USING THE SAME"; application Ser. No. 11/835,426, filed on Aug. 8, 2007, and entitled "OPTICAL PLATE AND BACKLIGHT MODULE USING THE SAME"; application Ser. No. 11/835,427, filed on Aug. 8, 2007, and entitled "OPTICAL PLATE AND BACKLIGHT MODULE USING THE SAME"; application Ser. No. 11/835,428, filed on Aug. 8, 2007, and entitled "OPTICAL PLATE AND BACKLIGHT MODULE USING THE SAME"; application Ser. No. 11/835,429, filed on Aug. 8, 2007, and entitled "OPTICAL PLATE AND BACKLIGHT MODULE USING THE SAME"; application Ser. No. 11/835,430, filed on Aug. 8, 2007, and entitled "OPTICAL PLATE AND BACKLIGHT MODULE USING THE SAME"; application Ser. No. 11/835,431, filed on Aug. 8, 2007, and entitled "OPTICAL PLATE AND BACKLIGHT MODULE USING THE SAME"; application Ser. No. 11/836,799, filed on Aug. 10, 2007, and entitled "OPTICAL PLATE AND BACKLIGHT MODULE USING THE SAME". In all these copending applications, the inventor is Shao-Han Chang et al. All of the copending applications have the same assignee as the present application. The disclosures of the above identified applications are incorporated herein by reference.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself illuminate light. Instead, the liquid crystal relies on light received from a light source, in order for the liquid crystal to display data or images. In the case of a typical liquid crystal display device, a backlight module powered by electricity supplies the needed light.

Figure 12:
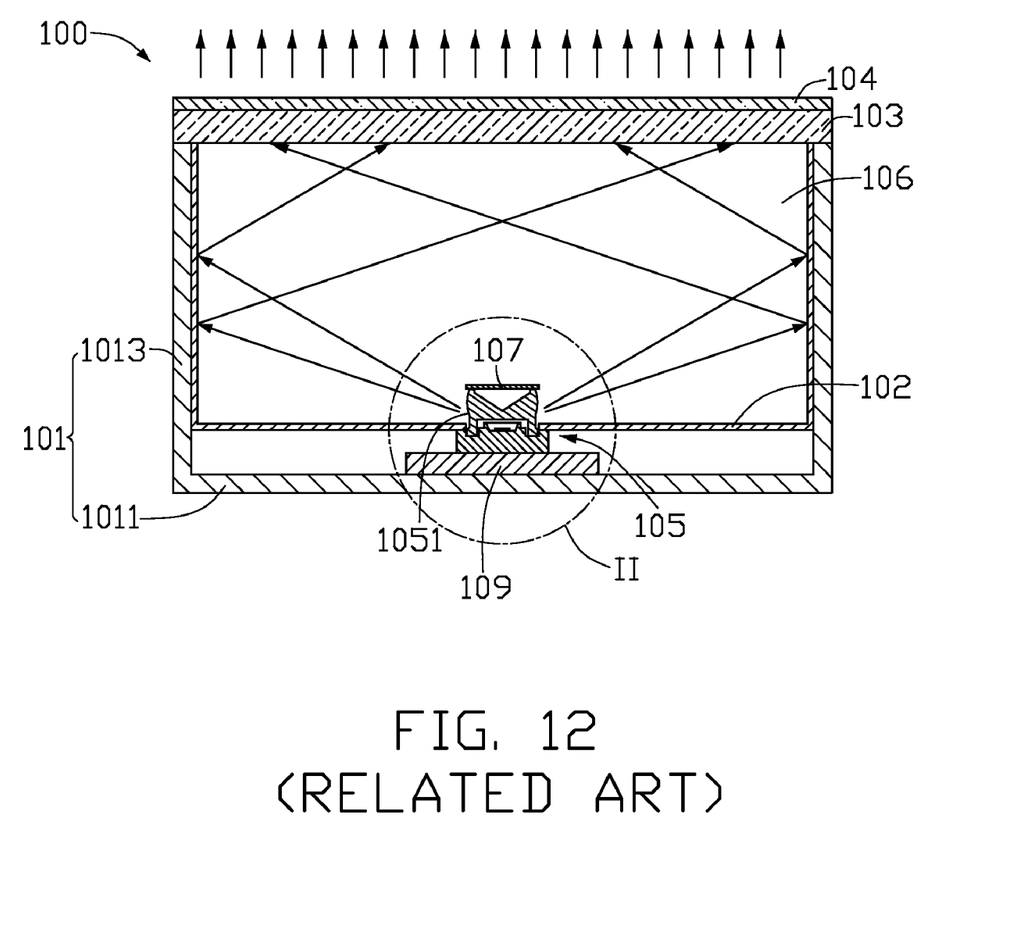
FIG. 12 is a side cross-sectional view of a conventional backlight module.
Figure 13:
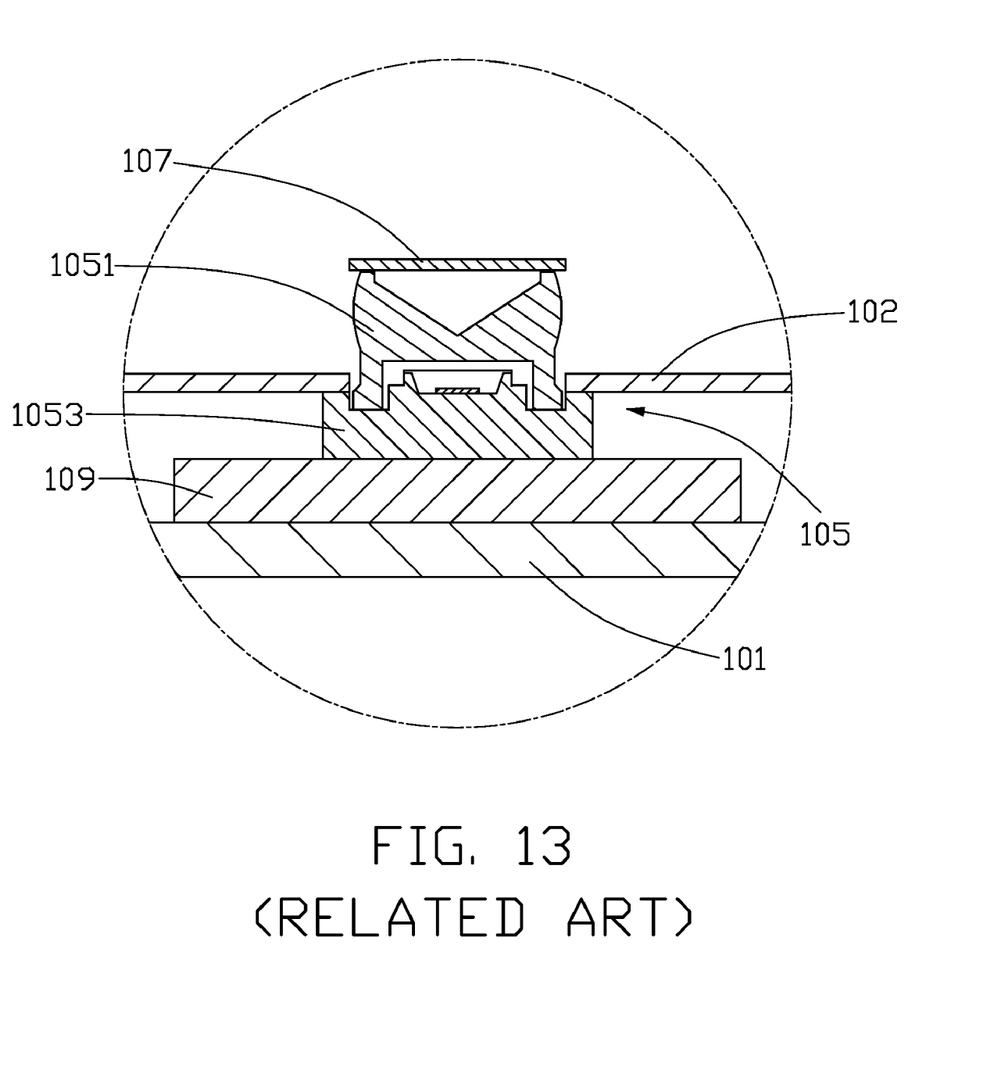
FIG. 13 is an enlarged view of a circle portion III of FIG. 12.

FIGS. 12 and 13 represent a typical direct type backlight module 100. The backlight module 100 includes a housing 101, a light reflective plate 102, a light diffusion plate 103, a prism sheet 104, and a plurality of light emitting diodes 105 (hereafter called LED). The housing 101 includes a rectangular base 1011 and four sidewalls 1013 extending from a periphery of the base 1011. The base 1011 and the four sidewalls 1013 cooperatively define a chamber 106. Each LED 105 includes a base portion 1053 and a light-emitting portion 1051 disposed on the base portion 1053. The LEDs 105 are electrically connected to a printed circuit board 109, and the printed circuit board 109 is fixed to the base 1011 of the housing 101. The light reflective plate 102 is disposed on the LEDs 105 in the chamber 106. The light reflective plate 102 defines a plurality of through holes (not labeled) that allows the light-emitting portions 1051 of the LED 105 to pass through and to emit light to be transmitted to the light diffusion plate 103. The light diffusion plate 103 and the prism sheet 104 are stacked in that order on the chamber 106. Light emitted from the LEDs 105 is substantially reflected by the light reflective sheet 102 to enter the light diffusion plate 103, and diffused uniformly in the light diffusion plate 103, and finally surface light is output from the prism sheet 104.

Generally, a plurality of darker areas may occur because of the reduced intensity of light between adjacent LEDs 105. In the backlight module 100, each LED 105 further includes a reflective sheet 107 disposed on the top of the light-emitting portion 1051, configured for decreasing the brightness of a portion of the backlight module 100 above the LED 105. However, the brightness of the backlight module 100 is still not uniform. One method of enhancing the uniformity of brightness of the backlight module 100 is to increase the space between the light diffusion plate 103 and the LEDs 105. This increase in space tends to eliminate dark areas. However, increasing the space between the diffusion plate 103 and the LEDs 105 will also increase the thickness of the backlight module and the overall intensity of the output light is reduced.

What is needed, therefore, is a new optical plate and a backlight module using the optical plate that can overcome the above-mentioned shortcomings.

SUMMARY

An optical plate according to a preferred embodiment includes at least one transparent plate unit. The transparent plate unit includes a light output surface, a bottom surface, a plurality of through holes and at least one lamp-receiving portion. The light output surface is opposite to the bottom surface. Each of the through holes communicates the light output surface with the bottom surface. The lamp-receiving portion is defined in the bottom surface.

A backlight module according to a preferred embodiment includes a housing, a side-lighting type point light source, an optical plate, and a light diffusion plate. The housing includes a base and a plurality of sidewalls extending from a periphery of the base, the base and the sidewalls cooperatively forming an opening. The point light source is disposed on the base, each point light source having a light-emitting portion. The same optical plate as described in the previous paragraph is employed in this embodiment. The light-emitting portion of the point light source is inserted in the lamp received portion of the optical plate correspondingly. The light diffusion plate is disposed on the housing over the opening.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout the several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
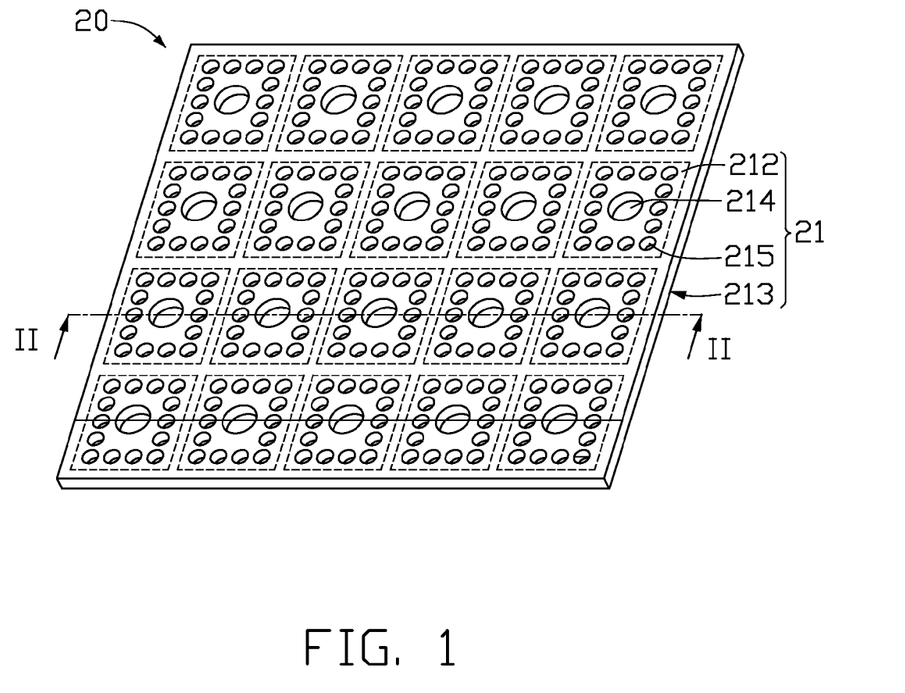
FIG. 1 is an isometric view of the optical plate according to a first preferred embodiment of the present invention.
Figure 2:
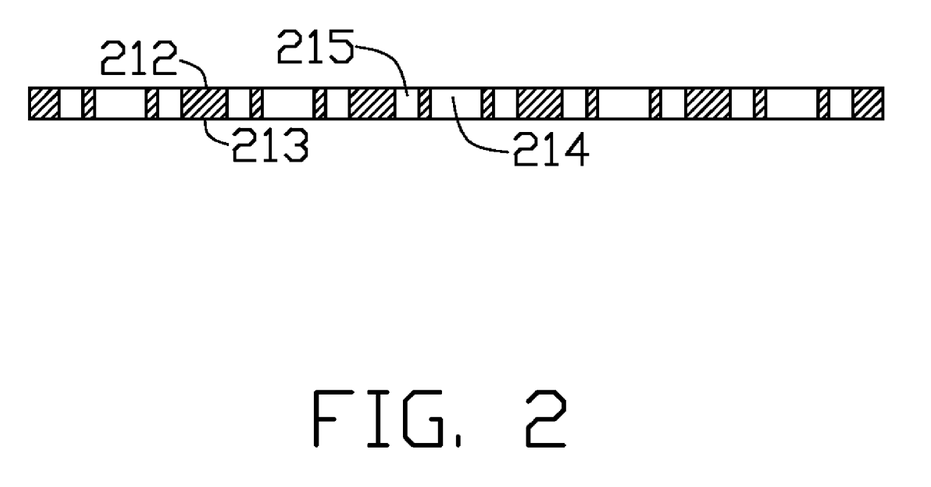
FIG. 2 is a cross-sectional view taken along line II-II of FIG. 1.

Referring to FIGS. 1 and 2, an optical plate 20 in accordance with a first preferred embodiment of the present invention is shown. The optical plate 20 is a transparent square plate, which includes a light output surface 212 and a bottom surface 213. The bottom surface 213 is opposite to the light output surface 212. Each of the through holes 215 communicates between the light output surface 212 and the bottom surface 213. In a preferred embodiment, the optical plate 20 is integrally formed of twenty small square transparent plate units 21. The optical plate 20 further defines a plurality of lamp-receiving portions 214 and a plurality of through holes 215. In a first preferred embodiment, the lamp-receiving portions 214 are defined at a center of each transparent plate unit 21 and the through holes 215 are formed around the lamp-receiving portion 214 of each transparent plate unit 21. Each of the through holes 215 is substantially a columnar hole.

The optical plate 20 can be made from materials selected from a group consisting of polycarbonate (PC), polymethyl methacrylate (PMMA), polystyrene (PS), copolymer of methylmethacrylate and styrene (MS), and any suitable combination thereof.

Figure 3:
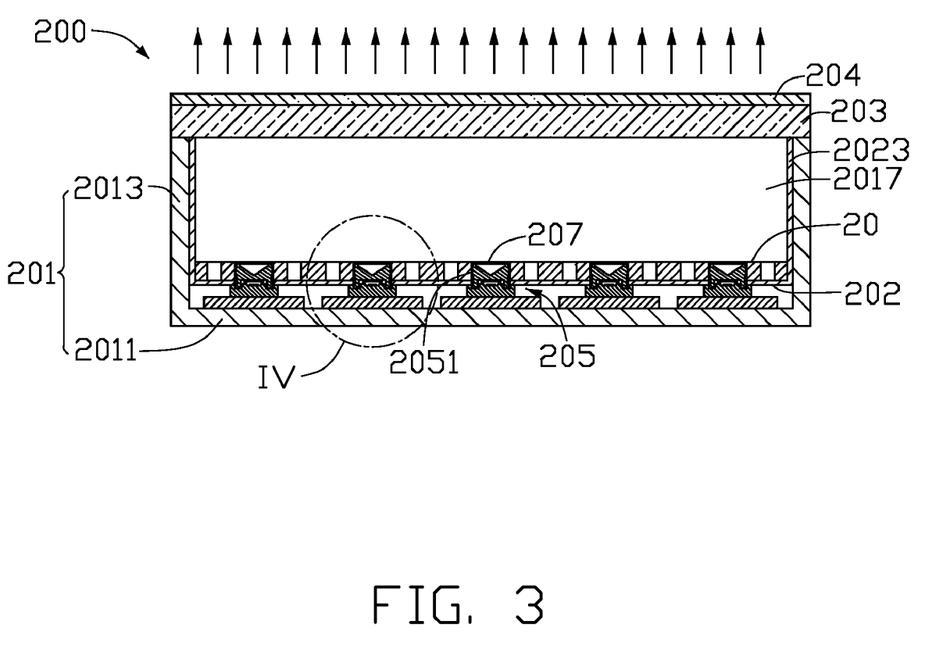
FIG. 3 is side cross-sectional view of a backlight module using the optical plate of FIG. 1 according to a second preferred embodiment of the present invention.
Figure 4:
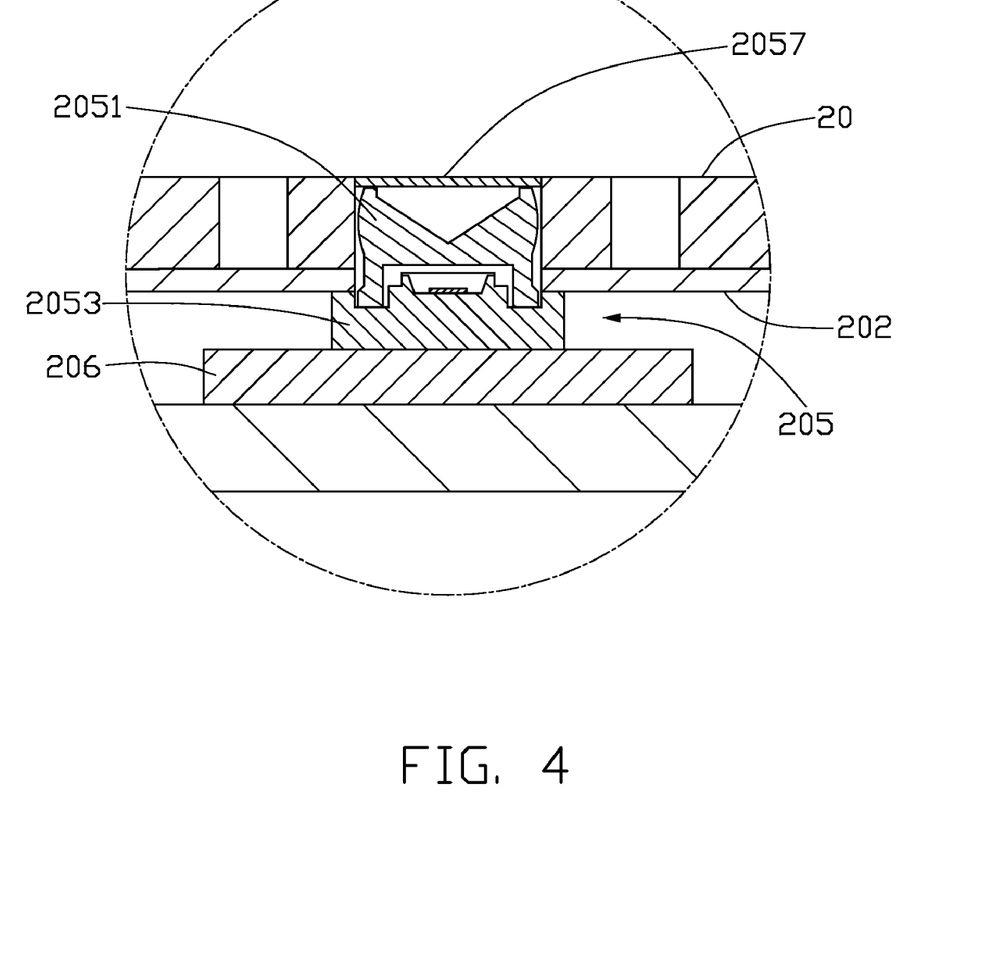
FIG. 4 is an enlarged view of a circle portion IV of FIG. 3.

Referring to FIGS. 3 and 4, a backlight module 200 in accordance with a second preferred embodiment of the present invention is shown. The backlight module 200 includes a housing 201, a light diffusion plate 203, a plurality of side-lighting type LEDs 205, and the optical plate 20. The optical plate 20 as described in the first preferred embodiment is employed in the second preferred embodiment. The housing 201 includes a rectangular base 2011 and four sidewalls 2013 extending around a periphery of the base 2011. The base 2011 and the sidewalls 2013 cooperatively form an opening 2017. The light diffusion plate 203 is disposed on the housing 201 over the opening 2017.

Referring to FIG. 4, the side-lighting type LED 205 includes a base portion 2053, a light-emitting portion 2051 disposed on the base portion 2053, and a reflective member 2057 disposed on the top of the light-emitting portion 2051. The LED 205 is electrically connected to a printed circuit board 206 that is fixed to the base 2011 of the housing 201. The light-emitting portion 2051 of the LED 205 is inserted into the lamp-receiving portion 214 of the optical plate 20. The light output surface 212 of the optical plate 20 faces the light diffusion plate 203.

In use, light emitted from the light-emitting portions 2051 of the LEDs 205 enters the optical plate 20 via inner surfaces of the lamp-receiving portions 214. A significant amount of the light is transmitted through the optical plate 20. The surfaces of the through holes 215 are curved, incident light that may have been repeatedly internally reflected on a flat surface, may be outputted after being reflected, at the curved surfaces of the through holes 215, one time. As a result, a great amount of light is able to be outputted, from the light output surface 212, faster.

Furthermore, because the side-lighting type LEDs 205 are positioned in the lamp-receiving portion 214, light uniformly exits from the light output surface 212 of the optical plate 20. Light from the optical plate 20 can be further substantially mixed in a chamber defined between the optical plate 20 and the light diffusion plate 203, before exiting the light diffusion plate 203 as uniform surface light. A distance from the LEDs 205 to the light diffusion plate 203 may be configured to be very short, with little or no risk of dark areas of the portion of the backlight module 200 above the LED 205. Accordingly, the backlight module 200 can have a thin configuration while still providing good, uniform optical performance.

In order to improve light energy utilization rate, the backlight module 200 may further include a light reflective plate 202 defining a plurality of through holes (not labeled) corresponding to the lamp-receiving portions 214 of the optical plate 20. The light reflective plate 202 is disposed underneath the bottom surface 213 of the optical plate 20 with the light-emitting portions 2051 of the LEDs 205 passing through the through holes of the light reflective plate 202 correspondingly. The light reflective plate 202 and the optical plate 20 are supported by the base portions 2053 of the LEDs 205. It should be pointed out that, the light reflective plate 202 can be omitted. In an alternative embodiment, a high reflective film can be deposited on inner surfaces of the base 2011 and the sidewalls 2013 of the housing 201. In other alternative embodiment, the housing 201 is made of metallic materials, and has high reflective inner surfaces.

It is to be understood that, in order to improve brightness of the backlight module 200 within a specific range of viewing angles, the backlight module 200 can further include a prism sheet 204 disposed on the light diffusion plate 203. In addition, in order to improve light energy utilization rate of the backlight module 200, the light reflective plate 202 can further include four reflective sidewalls 2023 extending from a periphery thereof. The reflective sidewalls 2023 contact with the sidewalls 2013 of the housing 201.

Figure 5:
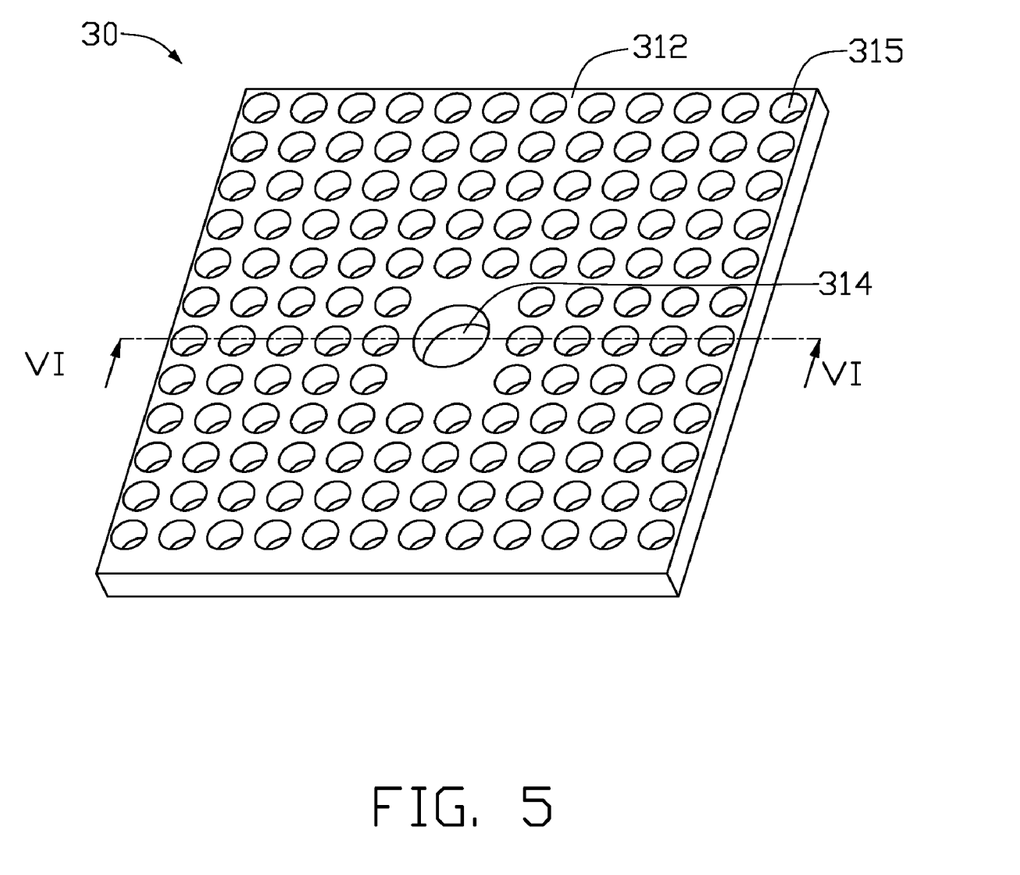
FIG. 5 is an isometric view of an optical plate according to a third preferred embodiment of the present invention.
Figure 6:
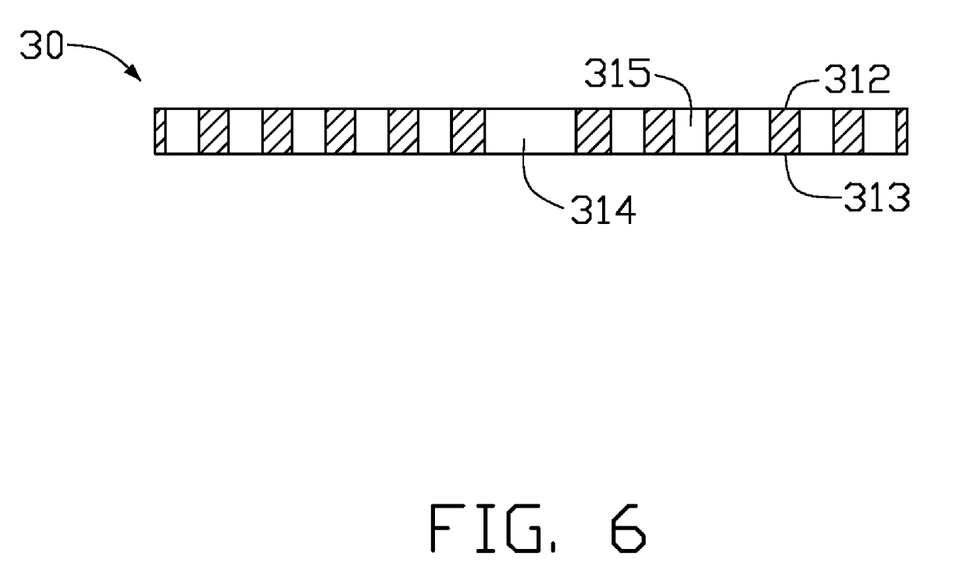
FIG. 6 is a cross-sectional view taken along line VI-VI of FIG. 5.

Referring to FIGS. 5 and 6, an optical plate 30 in accordance with a third preferred embodiment is shown. The optical plate 30 is similar in principle to the optical plate 20 of the first embodiment. However, only a lamp-receiving portion 314 is defined in a center of optical plate 30 communicating between a light output surface 312 and a bottom surface 313. A plurality of through holes 315 are distributed on the bottom surface 313 in a matrix manner except for a part of the lamp-receiving portion 314.

Figure 7:
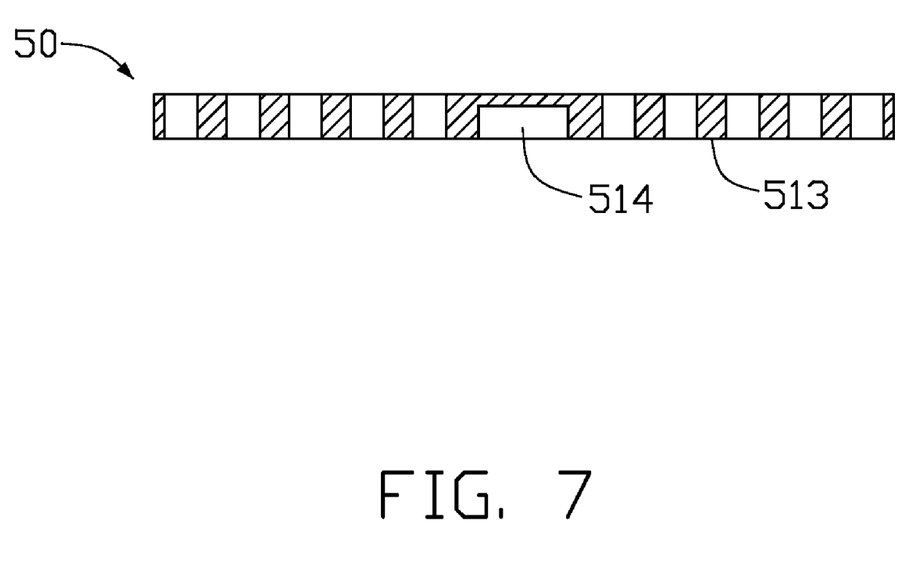
FIG. 7 is a side cross-sectional view of an optical plate according to a fourth preferred embodiment of the present invention.

Referring to FIG. 7, an optical plate 50 in accordance with a fourth preferred embodiment is shown. The optical plate 50 is similar in principle to the optical plate 30, except that a lamp-receiving portion 514 formed at the bottom surface 513 of the optical plate 50 is substantially a blind columnar hole.

Figure 8:
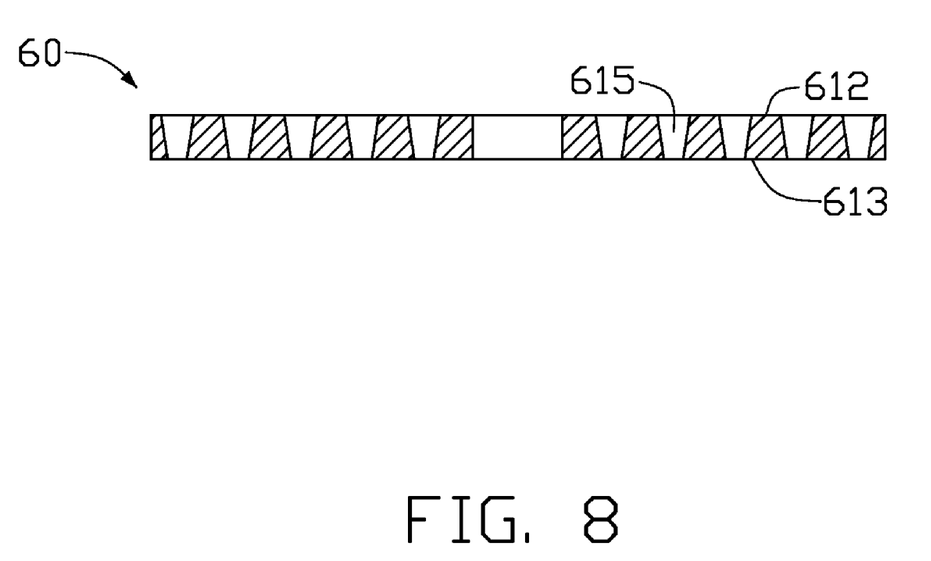
FIG. 8 is a side cross-sectional view of an optical plate according to a fifth preferred embodiment of the present invention.

Referring to FIG. 8, an optical plate 60 in accordance with a fifth preferred embodiment is shown. The optical plate 60 is similar in principle to the optical plate 30, except that each of the through holes 615 that communicates between the light output surface 612 and the bottom surface 613 is substantially a conical frustum in shape. A diameter of the through holes 615 gradually increases from the bottom surface 613 to the light output surface 612.

Figure 9:
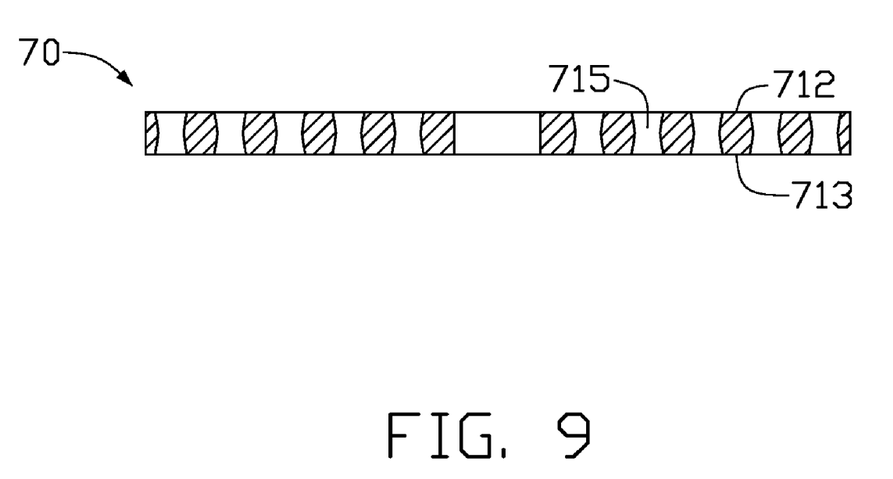
FIG. 9 is a side cross-sectional view of an optical plate according to a sixth preferred embodiment of the present invention.

Referring to FIG. 9, an optical plate 70 in accordance with a sixth preferred embodiment is shown. The optical plate 70 is similar in principle to the optical plate 30, except that each of the through holes 715 that communicate the light output surface 712 with the bottom surface 713 is a deformed columnar hole. A diameter of the abnormity columnar hole gradually increases from a middle portion to two its ends.

It is to be understood that, even though specific shape of through holes 215, 315, 615, 715 have been described and illustrated, the through holes 215, 315, 615, 715 can have various other suitable shapes. For example, the through holes 215, 315, 615, 715 can be frustums of pyramidal holes. Further, the through holes 215, 315, 615, 715 may be of different sizes and shapes.

Figure 10:
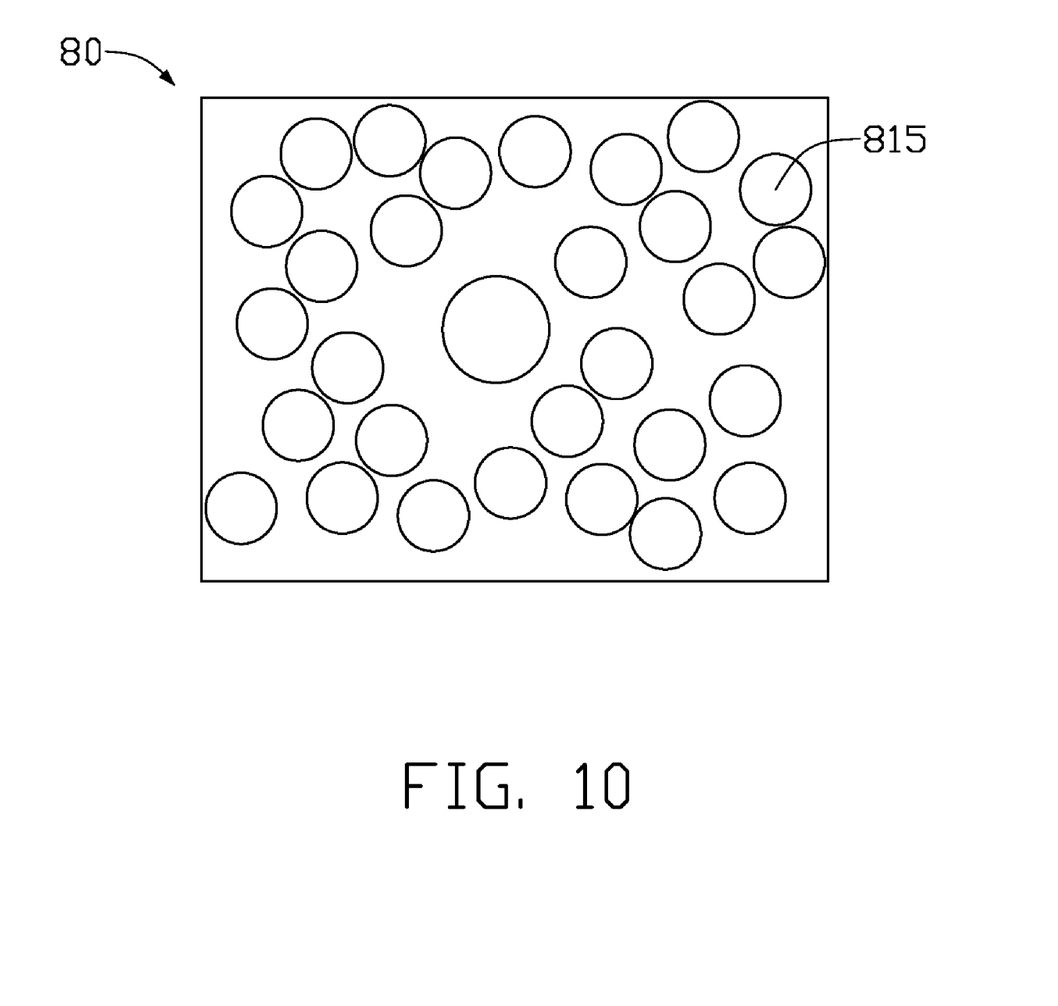
FIG. 10 is a top plan view of an optical plate according to a seventh preferred embodiment of the present invention.

Referring to FIG. 10, an optical plate 80 in accordance with a seventh preferred embodiment is shown. The optical plate 80 is similar in principle to the optical plate 30, except that the through holes 815 are distributed in the optical plate 80 in a random manner.

Figure 11:
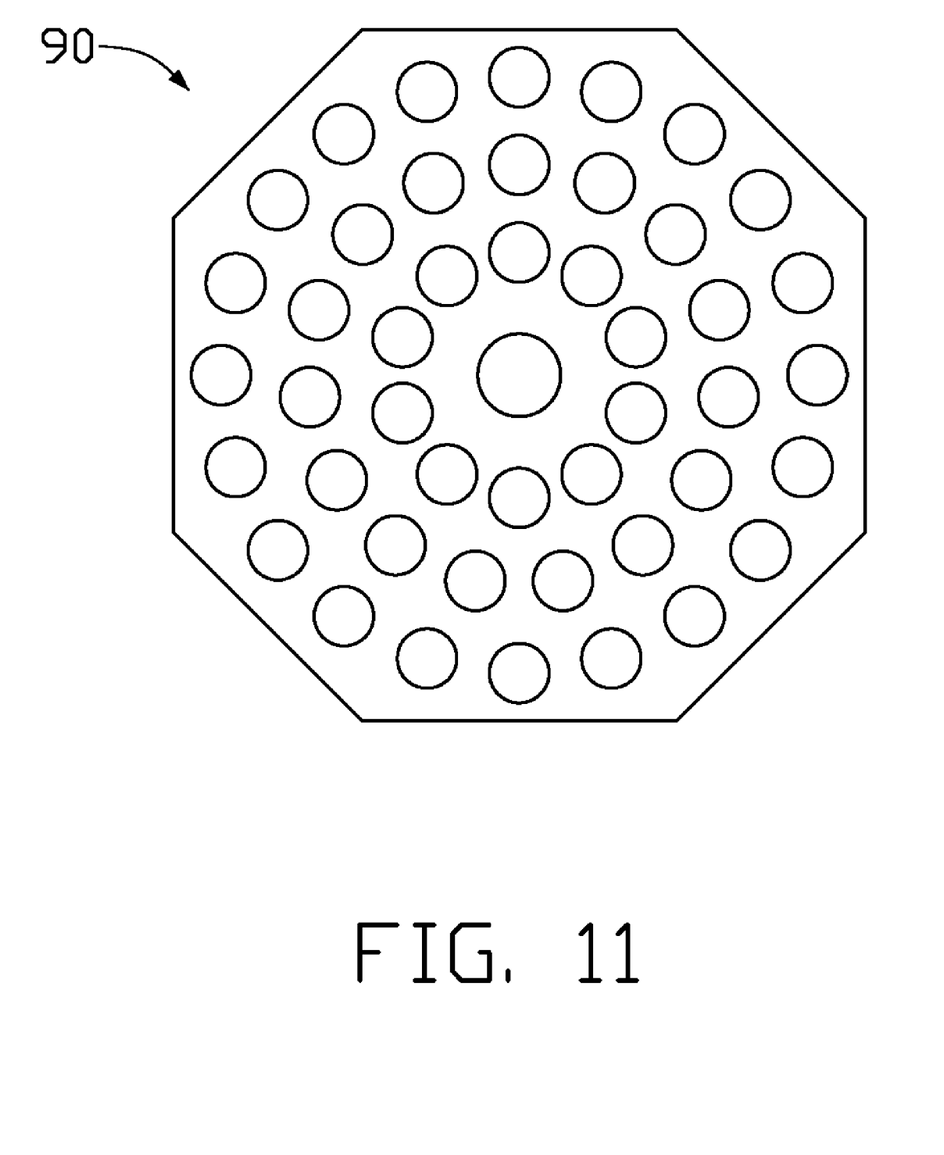
FIG. 11 is a top plan view of an optical plate according to an eighth preferred embodiment of the present invention.

Referring to FIG. 11, an optical plate 90 in accordance with a eighth preferred embodiment is shown. The optical plate 90 is similar in principle to the optical plate 30, except that the optical plate 90 is an octagonal plate. It is noted that the optical plate can be other shape. For example, the optical plate can be a triangular plate, a pentagonal plate, and a hexagonal plate.

In the backlight module 200, a plurality of red, green, and blue colored LEDs can be inserted into the lamp-receiving portions of the optical plate 20, such that a mixed white surface light can be obtained. It is to be understood that other kinds of point light source, such as field emission lamps and so on, can replace the LEDs in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a light output surface;
   a bottom surface opposite to the light output surface;
   a plurality of through holes that communicate between the light output surface and the bottom surface, each of the through holes is selected from a group consisting of a columnar hole, a conical frustum hole, and a hole with a diameter thereof gradually increasing from a middle portion to its periphery, the through holes guiding the light internally reflected between the light output surface and the bottom surface out of the optical plate; and
   at least one lamp-receiving portion defined in the bottom surface.

2. The optical plate according to claim 1, wherein the through holes formed in the optical plate surrounds the at least one lamp-receiving portion.

3. The optical plate according to claim 2, wherein the through holes are formed in the optical plate in a matrix manner except a part of the at least one lamp-receiving portion.

4. The optical plate according to claim 2, wherein the through holes are formed in the optical plate in a random manner except a part of the at least one lamp-receiving portion.

5. The optical plate according to claim 1, wherein the at least one lamp-receiving portion is selected from the group consisting of a blind hole and a through hole that communicates between the bottom surface and the light output surface.

6. The optical plate according to claim 1, wherein the optical plate is integrally formed of many of the at least one transparent plate units, each of the at least one lamp-receiving portions is defined in a center of each of the at least one transparent plate units, and in each of the at least one transparent plate units, the through holes are distributed surrounding the lamp-receiving portion.

7. A backlight module comprising:
   a housing having a base and a plurality of sidewalls extending from a periphery of the base, the base and the sidewalls cooperatively forming an opening;
   at least one side-lighting type point light source disposed on the base, each point light source having a light-emitting portion;
   an optical plate positioned in the housing, the optical plate including at least one transparent plate unit having:
   a light output surface;
   a bottom surface opposite to the light output surface;
   a plurality of through holes that communicate between the light output surface and the bottom surface, each of the through holes is selected from the group consisting of a columnar hole, a conical frustum hole, and a hole with a diameter thereof gradually increasing from a middle portion to its periphery, the through holes guiding the light internally reflected between the light output surface and the bottom surface out of the optical plate; and
   at least one lamp-receiving portion defined in the bottom surface, wherein the light-emitting portion of the at least one point light source is inserted in the lamp-receiving portion correspondingly; and
   a light diffusion plate disposed on the housing over the opening.

8. The backlight module according to claim 7, further comprising a light reflective plate defining a through hole therein, the light reflective plate being disposed underneath the bottom surface of the optical plate, and the point light source passing through the light reflective plate via the through hole.

9. The backlight module according to claim 8, wherein the light reflective plate further comprises a plurality of reflective sidewalls extending from a periphery thereof and contact with the sidewalls of the housing.

10. The backlight module according to claim 7, the housing is made of metal materials, and has high reflectivity inner surfaces.

11. The backlight module according to claim 7, further comprising a high reflectivity film deposited on inner surfaces of the base and the sidewalls of the housing.

12. The backlight module according to claim 7, further comprising a prism sheet disposed on the light diffusion plate.

* * * * *